(12) United States Patent
Tusch et al.

(10) Patent No.: US 11,950,575 B2
(45) Date of Patent: Apr. 9, 2024

(54) MODULAR HOUSING STRUCTURE FOR SOLITARY BEES

(71) Applicants: Richard John Pierre Tusch, Delaware (CA); William Louis Tusch, Delaware (CA)

(72) Inventors: Richard John Pierre Tusch, Delaware (CA); William Louis Tusch, Delaware (CA)

(*) Notice: Subject to any disclaimer, the term of this patent is extended or adjusted under 35 U.S.C. 154(b) by 0 days.

(21) Appl. No.: 17/779,797

(22) PCT Filed: Nov. 27, 2020

(86) PCT No.: PCT/CA2020/051627
§ 371 (c)(1),
(2) Date: May 25, 2022

(87) PCT Pub. No.: WO2021/102584
PCT Pub. Date: Jun. 3, 2021

(65) Prior Publication Data
US 2023/0009326 A1    Jan. 12, 2023

Related U.S. Application Data

(60) Provisional application No. 62/941,169, filed on Nov. 27, 2019.

(51) Int. Cl.
*A01K 47/06* (2006.01)
(52) U.S. Cl.
CPC .................... *A01K 47/06* (2013.01)

(58) Field of Classification Search
CPC ....... A01K 47/06; A01K 47/00; A01K 67/033
USPC .................................................. 449/4, 32, 26
See application file for complete search history.

(56) References Cited

U.S. PATENT DOCUMENTS

| 909,973 | A | * | 1/1909 | Ward | A01K 47/00 449/31 |
| 3,191,199 | A | * | 6/1965 | Barnes, Jr. | A01K 67/033 449/4 |
| 4,628,558 | A | | 12/1986 | Paderson | |
| 6,364,738 | B1 | * | 4/2002 | Kendell | A01K 47/00 449/29 |
| 7,086,924 | B2 | | 8/2006 | Mills | |
| 8,465,340 | B1 | | 6/2013 | Allan | |

(Continued)

FOREIGN PATENT DOCUMENTS

| CN | 109824332 | A | * | 5/2019 | C04B 28/10 |
| EP | 2039244 | A2 | * | 3/2009 | A01K 47/00 |

(Continued)

OTHER PUBLICATIONS

DIY Extra, https://www.diy-extra.co.uk/concrete_and_mortar_guide. html, Apr. 24, 2018. (Year: 2018).*

(Continued)

*Primary Examiner* — Kathleen I Alker (57) ABSTRACT

A modular housing structure for solitary bees, having a core partially enclosed within a housing with an opening on one side. The core has an exposed side facing the opening on the housing and one or more recesses formed on the exposed side of the core. The core may be solid and integrally formed with the housing or may be made up of a plurality of wafers stacked on top of one another.

5 Claims, 14 Drawing Sheets

(56) References Cited

U.S. PATENT DOCUMENTS

| | | | | |
|---|---|---|---|---|
| 8,602,837 B1 * | 12/2013 | Allan | ................ | A01K 47/00 |
| | | | | 449/27 |
| 11,470,824 B2 * | 10/2022 | Clark | ................ | A01K 47/06 |
| 2018/0255748 A1 | 9/2018 | Vanderhoff | | |
| 2019/0075762 A1 | 3/2019 | Kapka et al. | | |
| 2021/0127644 A1 * | 5/2021 | Ritz | ................ | A01K 47/06 |

FOREIGN PATENT DOCUMENTS

| | | | | |
|---|---|---|---|---|
| RU | 190882 U1 * | 7/2019 | ............ | A01K 47/06 |
| WO | WO-2020025899 A1 * | 2/2020 | ............ | A01K 47/00 |

OTHER PUBLICATIONS

Quikrete, https://www.quikrete.com/productlines/portlandcement.asp, Nov. 3, 2017 (Year: 2017).*

Machine translation of EP-2039244-A2 to Allan, Mar. 2009. (Year: 2009).*

Machine translation of RU-190882-U1 to Gaul, Jul. 2019. (Year: 2019).*

Machine translation of CN-109824332-A to Yang, May 2019. (Year: 2019).*

Machine translation of WO-2020025899-A1 to Somville, Feb. 2020. (Year: 2020).*

* cited by examiner

MODULAR HOUSING STRUCTURE FOR SOLITARY BEES

FIELD OF THE INVENTION

The present invention relates to natural conservation devices, in particular, to a modular housing structure for solitary bees.

BACKGROUND

Native pollinating species, such as bees, are essential for plant reproduction and crop yield development. Everyone from backyard gardeners to large agricultural operations rely on pollinating species. However, habitat destruction, as a result of urban expansion and other human activities, puts a significant strain on natural ecosystems including on these essential pollinating species.

Accordingly, there is a need for devices to assist with natural conservation efforts directed to rebuilding and maintaining the habitat for pollinating species, such as bees.

SUMMARY OF THE INVENTION

A modular housing structure for solitary bees, according to the present invention, has a core partially enclosed within a housing having an opening on one side. The core has one or more recesses formed on one side and, wherein the core is positioned such that the one or more recesses are facing the opening on the housing.

In one embodiment, a modular housing structure for solitary bees has a housing with a substantially solid core. The core has at least one exposed side that is exposed from the housing and has a plurality of recesses formed on the at least one exposed side.

In another embodiment of the modular housing structure, the housing and the core are integrally formed and the housing extends outwardly from the core to form a ridge about the perimeter of the at least one side of the core.

In another embodiment, the core comprises a plurality of wafers stacked on top of one another and partially enclosed within a housing having an opening on one side. Each of the plurality of wafers has a top, a bottom, and opposing sides and one or more recesses formed on one of the sides. The plurality of wafers are arranged such that the one or more recesses are facing the opening on the housing.

In another embodiment of the modular housing structure, the plurality of wafers are made of a porous material to permit drainage of water.

In another embodiment of the modular housing structure, the plurality of wafers are made from a mixture of sand, Portland cement, and water. The ratio of sand to Portland cement is 4:1 and the mixture is 20% water.

In another embodiment of the modular housing structure, the one or more recesses in each of the wafers have a diameter between 4 mm and 8 mm.

In another embodiment of the modular housing structure, each of the plurality of wafers is made up of a top section and a bottom section that together form a wafer.

In another embodiment of the modular housing structure, the housing is mounted on a post.

In another embodiment of the modular housing structure, the housing has a plurality of legs extending downwardly from the housing to raise the housing off the ground.

In another embodiment of the modular housing structure, the plurality of recesses are generally round and have a diameter of between 4 mm and 8 mm.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF THE INVENTION

The modular housing structure, according to the present invention, provides a habitat for solitary bees, such as the Leafcutter or Mason bee. The modular housing structure provide an artificial nesting location for female solitary bees to lay their eggs. The eggs remain well protected in the modular housing structure, while they hatch and develop into adult bees before emerging the following Spring.

As shown in FIGS. 1-6, the modular housing structure has a housing 2 with a substantially solid core 5. The core 5 is partially enclosed within the housing 2 and has at least one exposed side that is exposed from the housing 2. The core 5 has a plurality of recesses 3 formed on the exposed side, so as to expose the recesses 3 to the environment outside the housing 2. The housing 2 may extend outwardly from the core 5 about the perimeter of the exposed side of the core 5. The housing 2 thereby forms a ridge 6 or wall about the perimeter of the exposed side of the core 5, which partially shields the recesses 3 from the elements. Preferably, the plurality of recesses 3 are generally round and have a diameter of between 4 mm and 8 mm.

Figure 1:
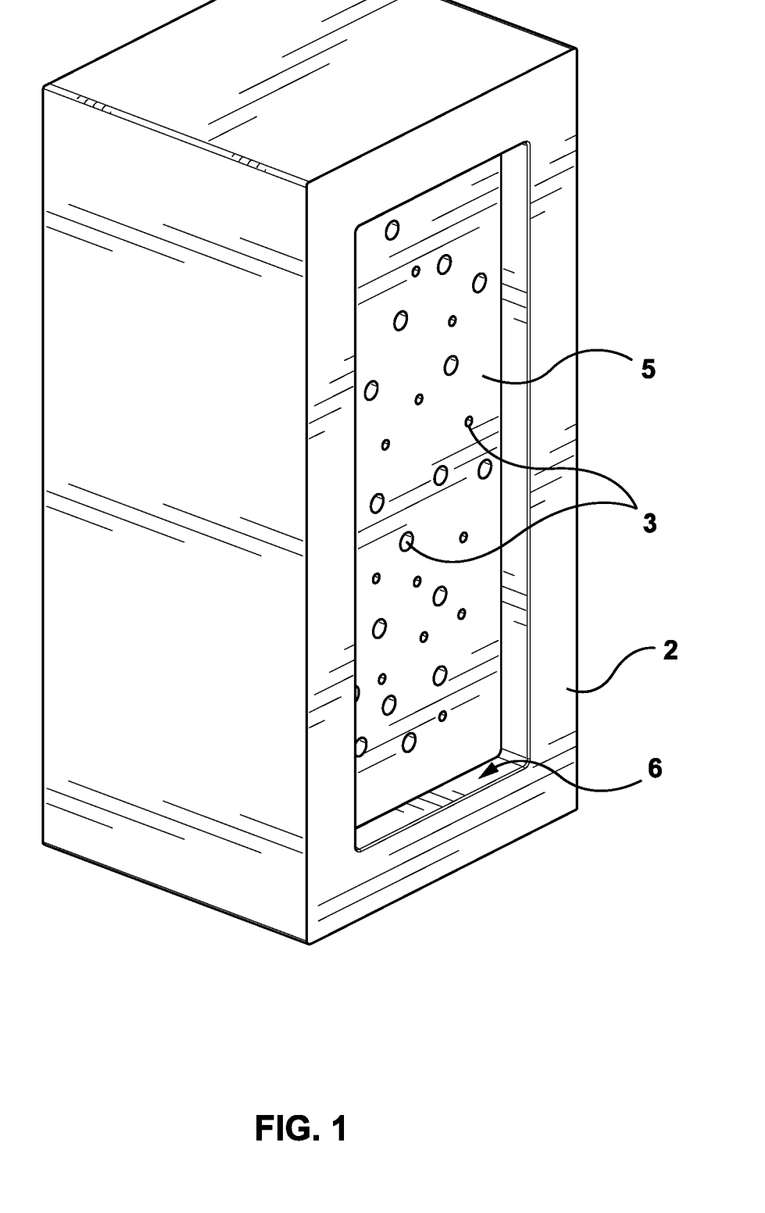
FIG. 1 is a perspective view of a modular housing structure for bees, according to the present invention.
Figure 2:
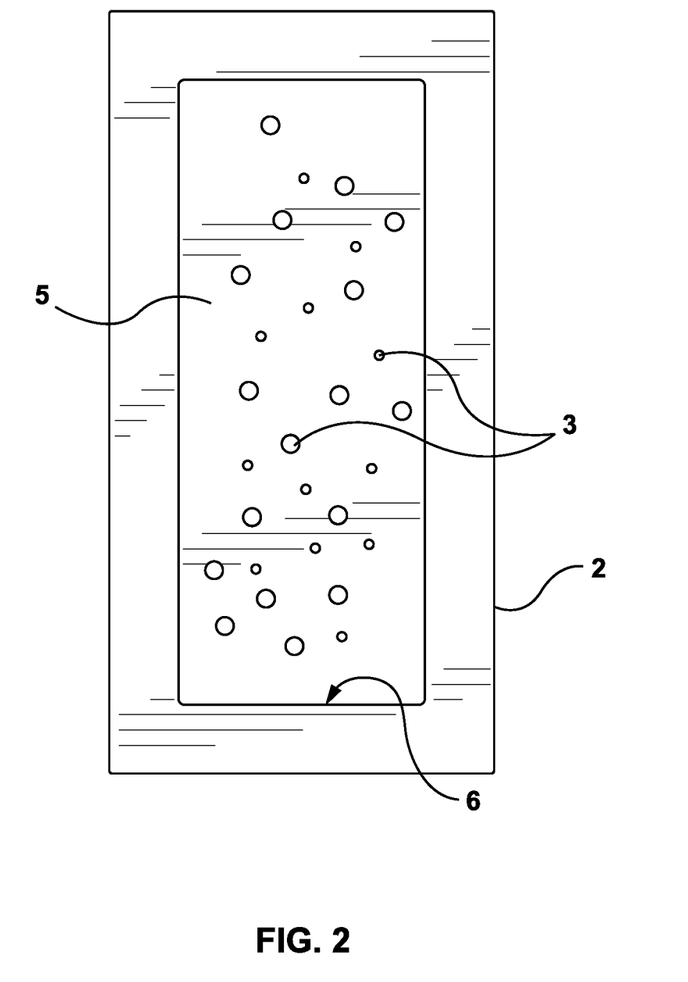
FIG. 2 is a front view the modular housing structure of FIG. 1.
Figure 3:
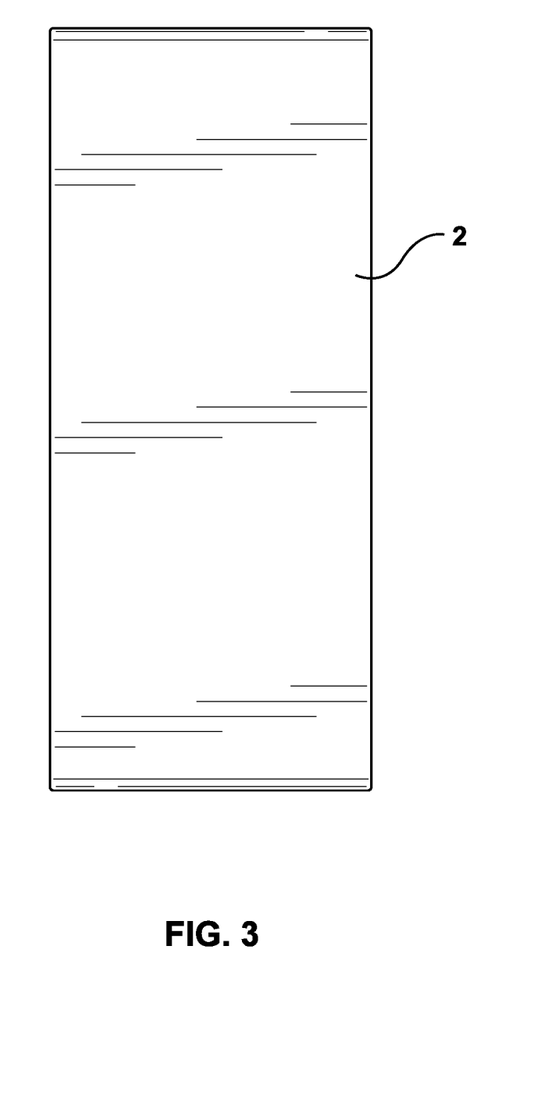
FIG. 3 is a side view of the modular housing structure of FIG. 1.
Figure 4:
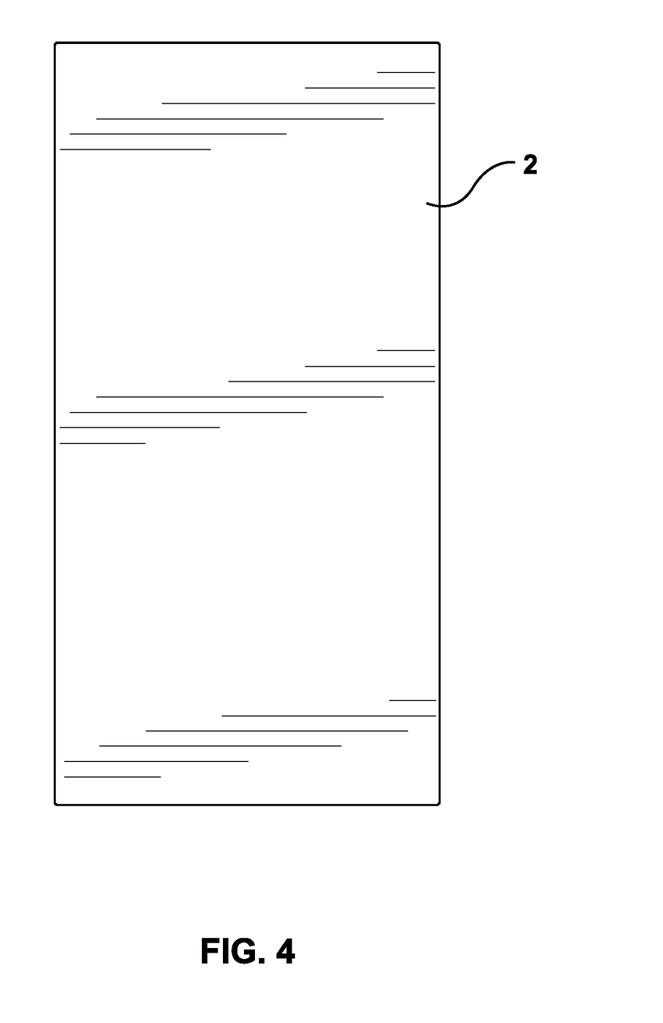
FIG. 4 is a rear view of the modular housing structure of FIG. 1.
Figure 5:
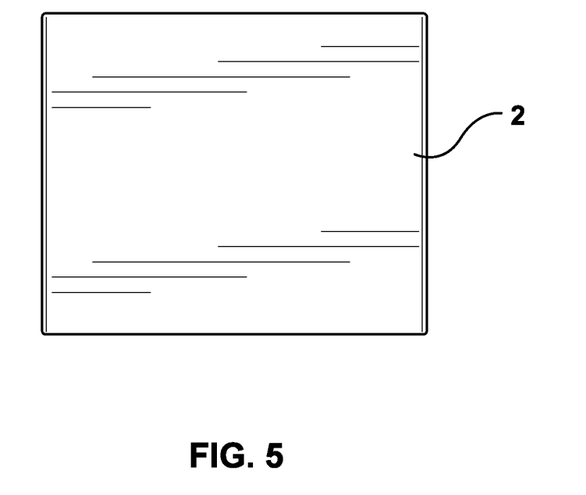
FIG. 5 is a top view of the modular housing structure of FIG. 1.
Figure 6:
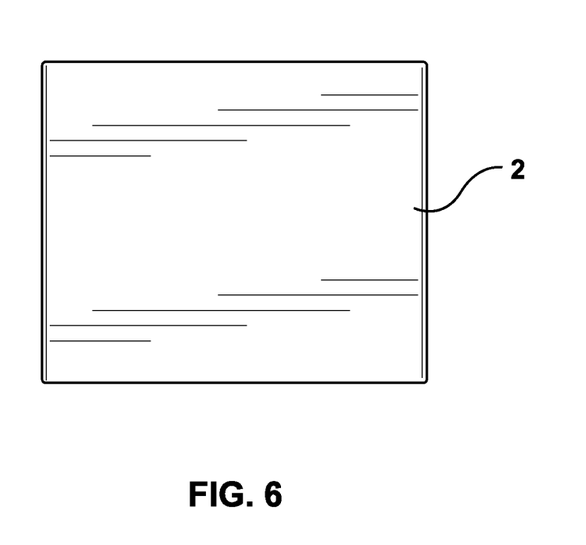
FIG. 6 is a bottom view of the modular housing structure of FIG. 1.
Figure 7:
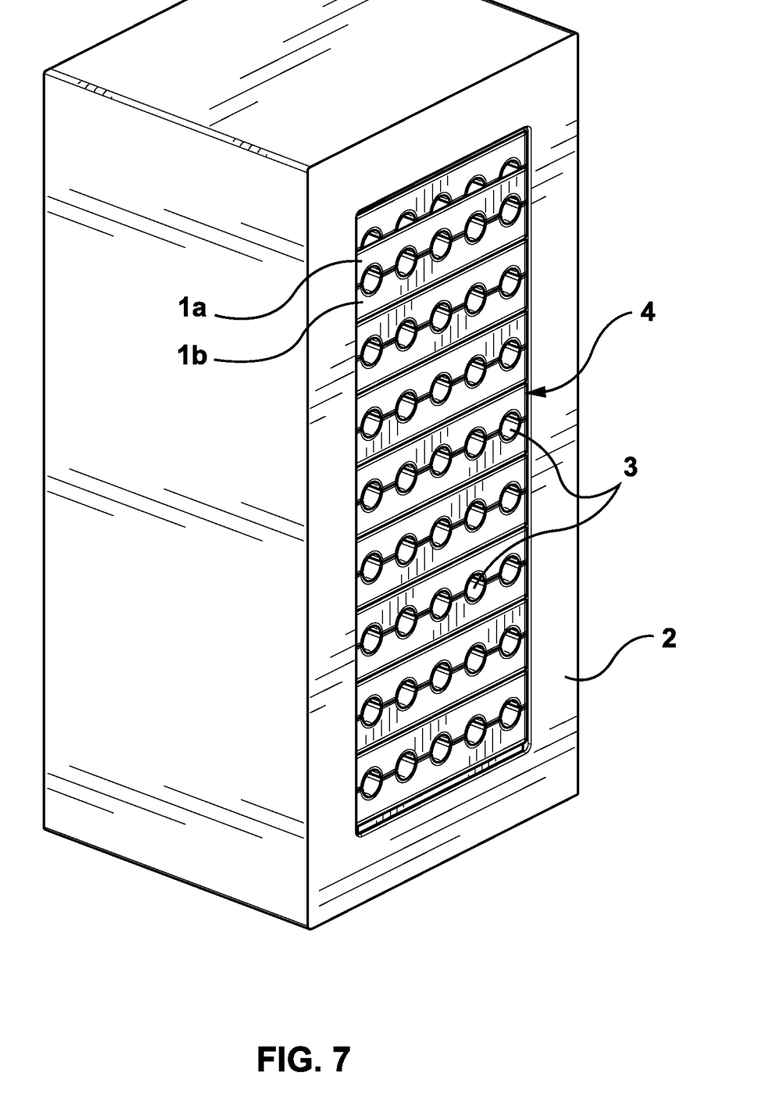
FIG. 7 is a perspective view of another embodiment of the modular housing structure, with a plurality of wafers inside a housing.
Figure 8:
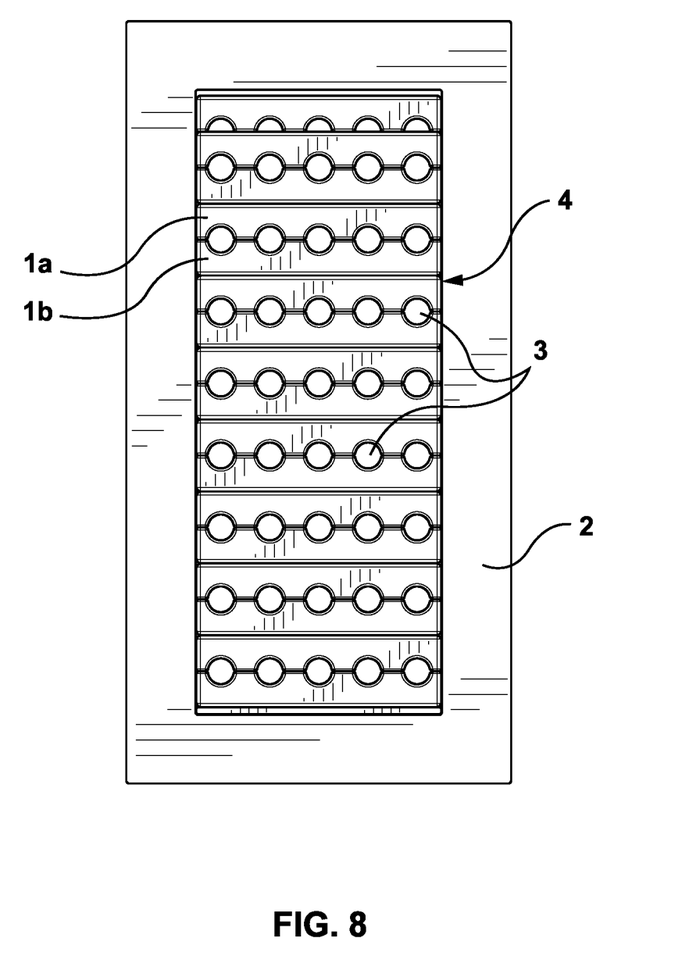
FIG. 8 is a front view of the modular housing structure of FIG. 7.
Figure 9:
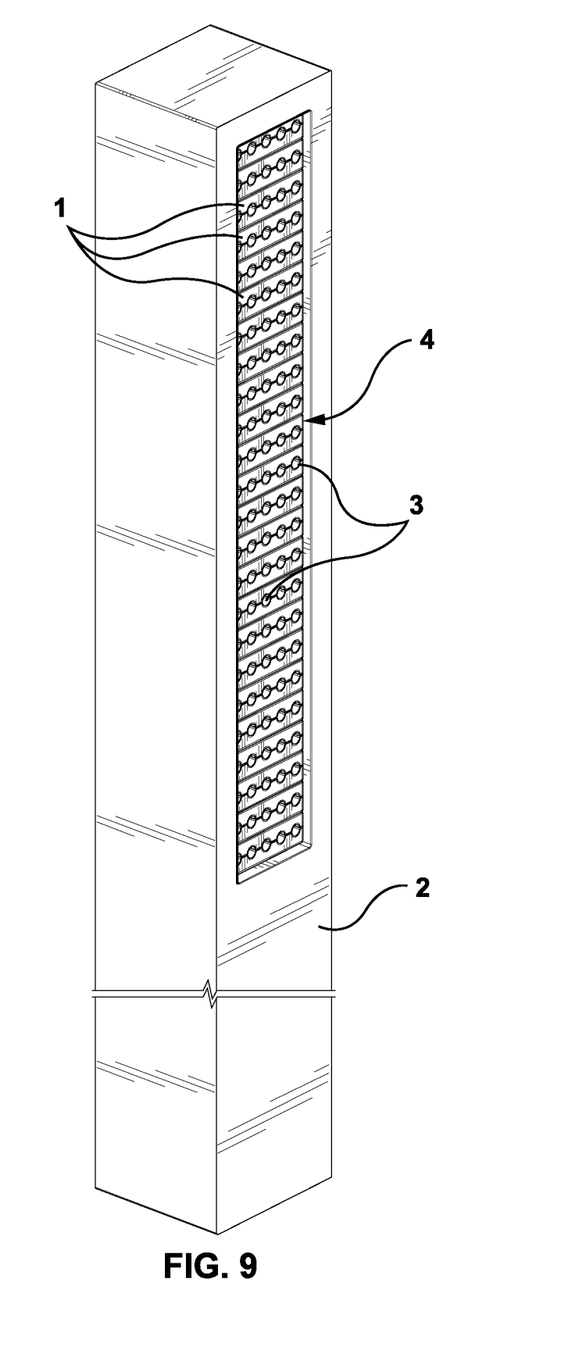
FIG. 9 is a perspective view of another embodiment of the modular housing structure, with an extended base to raise the housing structure off the ground.
Figure 10:
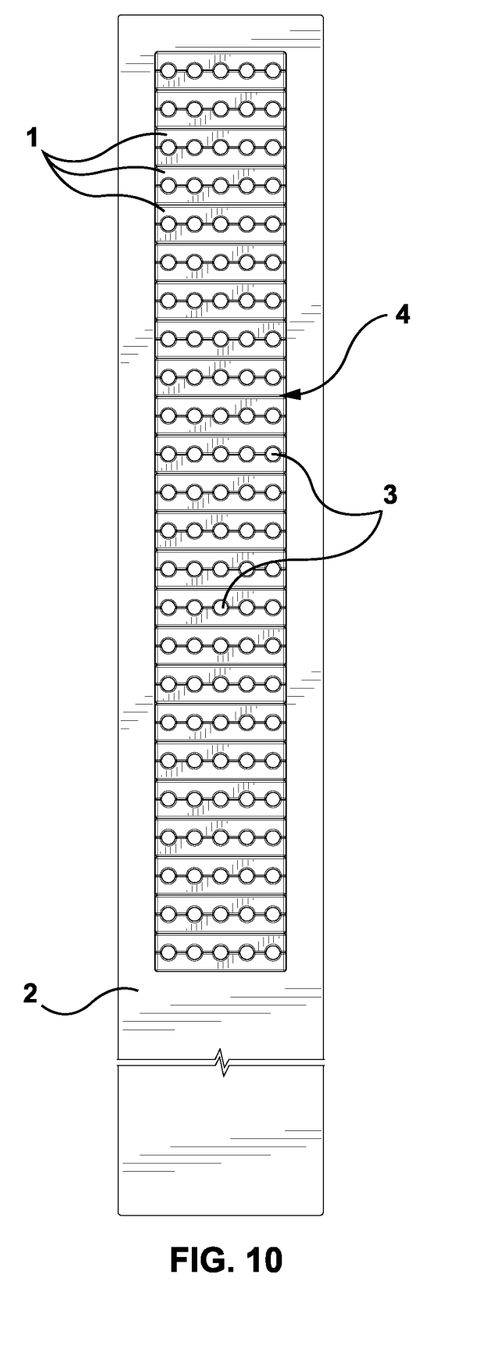
FIG. 10 is a front view of the modular housing structure of FIG. 9.
Figure 11:
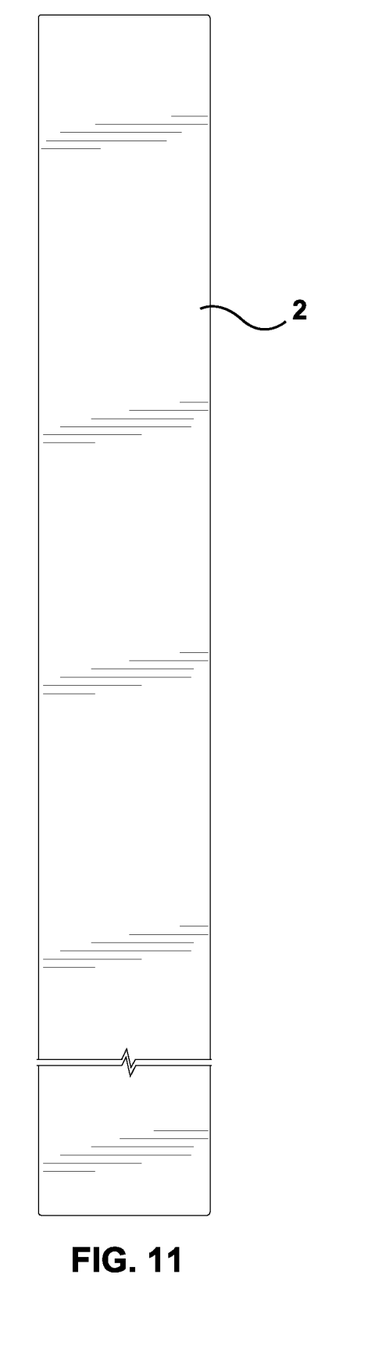
FIG. 11 is a left-side view of the modular housing structure of FIG. 9.
Figure 12:
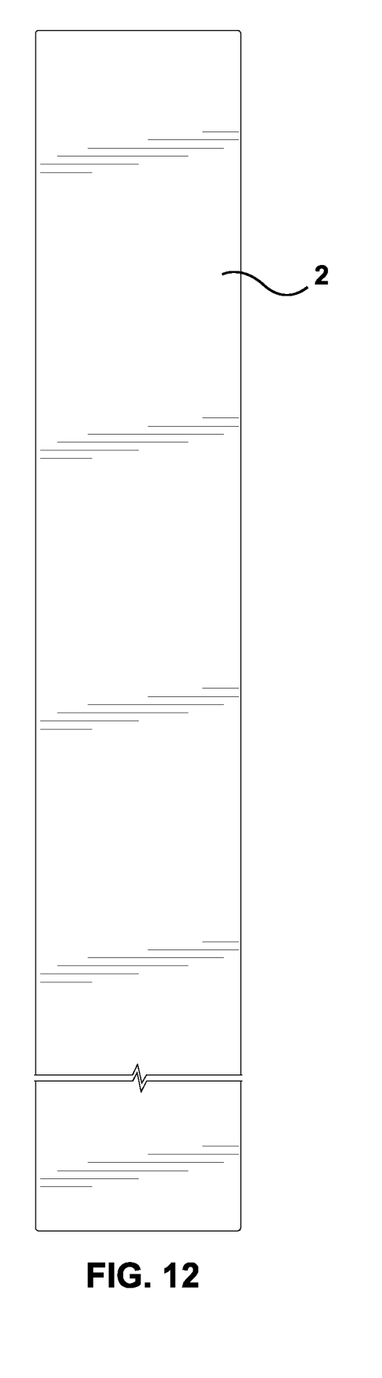
FIG. 12 is a rear view of the modular housing structure of FIG. 9.
Figure 13:
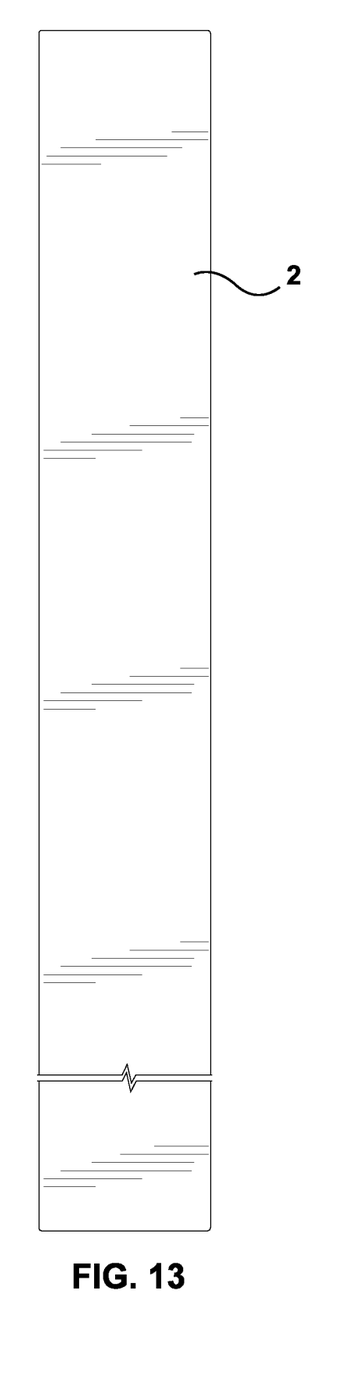
FIG. 13 is a right-side view of the modular housing structure of FIG. 9.
Figure 14:
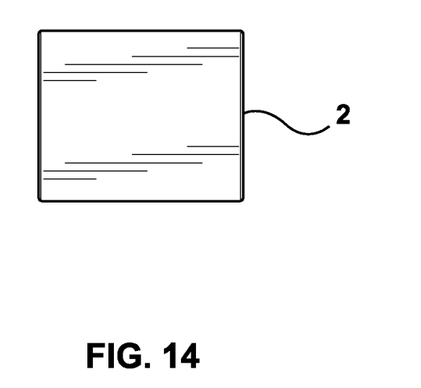
FIG. 14 is a top view of the modular housing structure of FIG. 9.
Figure 15:
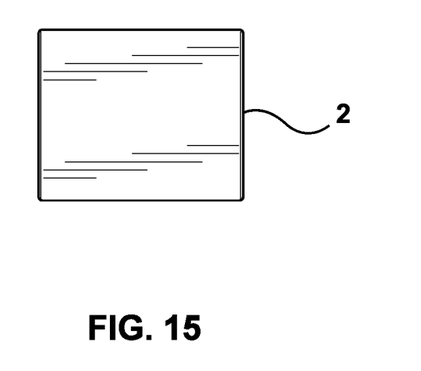
FIG. 15 is a bottom view of the modular housing structure of FIG. 9.
Figure 16:
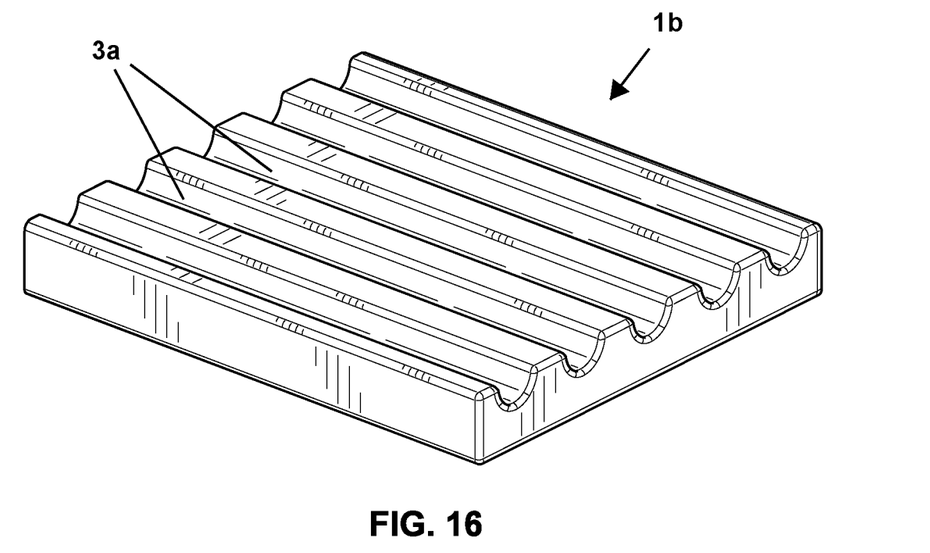
FIG. 16 is a perspective view of a wafer for the modular housing structure, according to the present invention.
Figure 17:
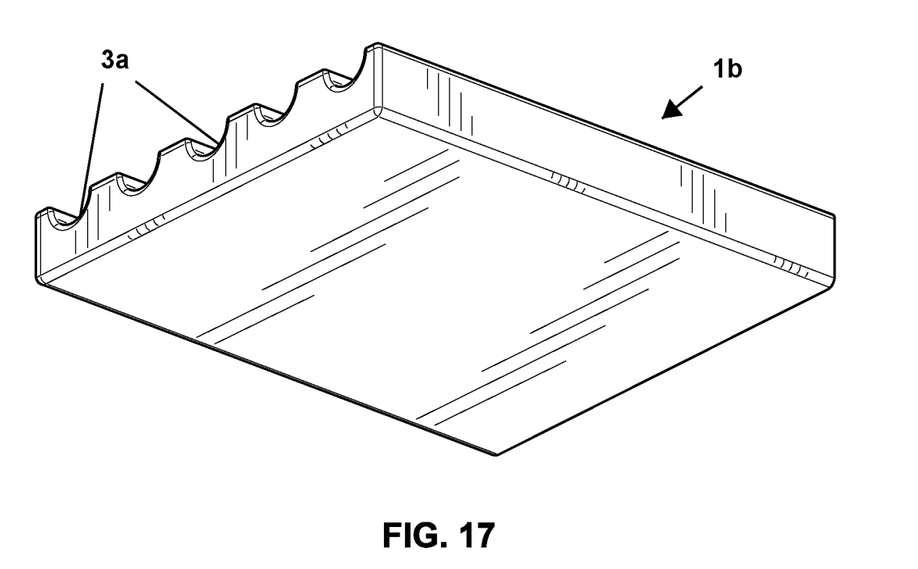
FIG. 17 is another perspective view of the wafer of FIG. 16.
Figure 18:
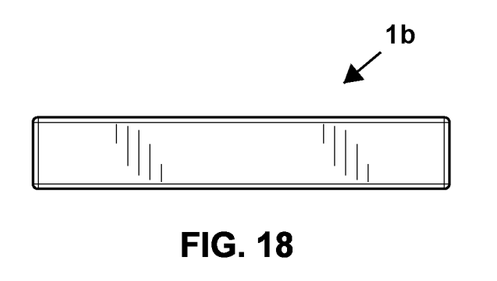
FIG. 18 is a left-side view of the wafer of FIG. 16.
Figure 19:
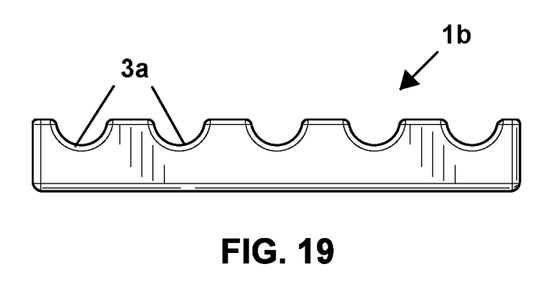
FIG. 19 is a front view of the wafer of FIG. 16.
Figure 20:
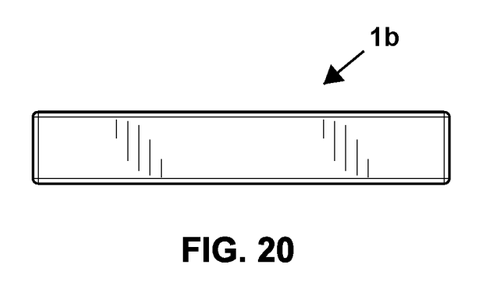
FIG. 20 is a right-side view of the wafer of FIG. 16.
Figure 21:
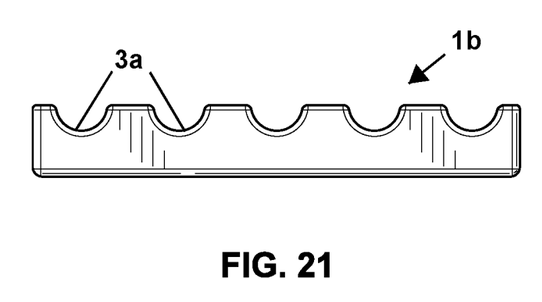
FIG. 21 is a rear view of the wafer of FIG. 16.
Figure 22:
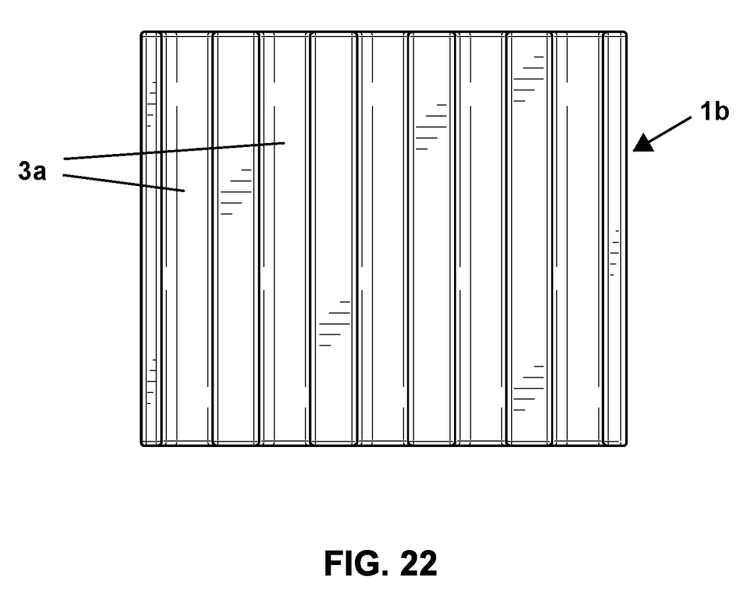
FIG. 22 is a top view of the wafer of FIG. 16.
Figure 23:
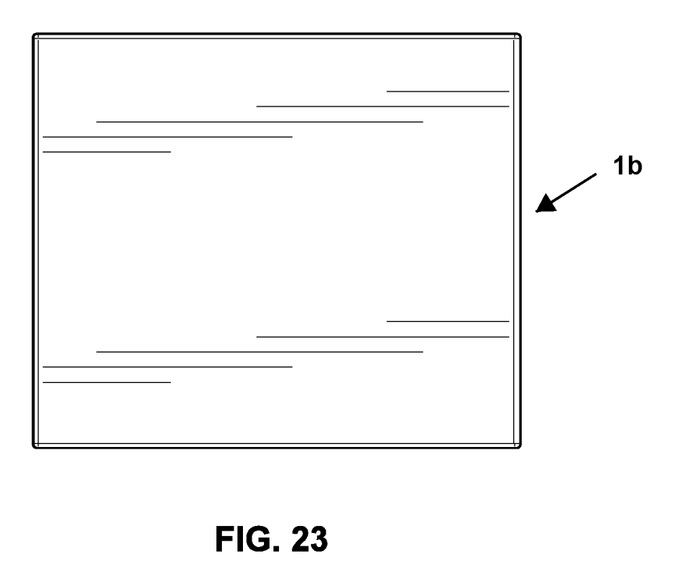
FIG. 23 is a bottom view of the wafer of FIG. 16.

As shown in FIGS. 7 and 8, the core 5 of the modular housing structure may be made up of a plurality of wafers 1 stacked on top of one another and partially enclosed within the housing 2. The housing 2 partially encloses the plurality of wafers 1 in a stack and has an opening 4 on one side to permit access to the recesses 3 on the plurality of wafers 1. Preferably, the opening 4 has a width less than the width of the wafers 1 to retain the wafers 1 within the housing 2, but still permit free access to the recesses 3.

As shown in FIGS. 16-23, the wafers 1 are generally flat, thin blocks that each have a top, a bottom, and opposing sides. One or more recesses 3 are formed on one of the sides, taking the shape of generally circular tunnels into the wafer 1. Preferably, each wafer 1 has a plurality of recesses 3 on the same side of varying sizes between 4 mm and 8 mm in diameter. The plurality of wafers 1 forms a stack and each adjacent wafer 1 in the stack may have the same or a different arrangement of recesses 3 on one side to give a consistent or varied appearance to the modular housing structure.

Preferably, to facilitate harvesting of the dormant bees in the wafers 1, each wafer 1 may be formed in two sections, a top section 1a and a bottom section 1b, that together form the wafer 1. The recesses 3 are formed by bringing together complementary semi-circular grooves 3a formed on the adjacent top and bottom faces of the bottom section 1b and the top section 1a of the wafer 1, respectively. Alternatively, the wafers 1 may have one or more recesses 3 on two or more sides. In any case, each wafer 1 in the stack is arranged with a side having recesses 3 formed thereon facing towards the side of the core 5 that is exposed from the housing 2.

The housing 2 may also permit the stack of wafers 1 to be removed and replaced to facilitate harvesting of any dormant bees in the recesses 3. For example, one side of the housing 2 may be hingedly attached and selectively locked in place. When access to the stack of wafers 1 is desired, the housing 2 may be unlocked and the hinged side swung outwardly to expose the wafers 1. Alternatively, one side of the housing 2 may be slidably attached and fitted within grooves in the adjacent sides. As a further alternative, the top of the housing 2 may be removable and the stack of wafers 1 may be connected to facilitate their removal, as a stack, from the top of the housing 2. For example, each of the plurality of wafers 1 may have an aperture extending vertically through the centre of the wafer 1. The plurality of wafers 1 may be stacked on a post extending upwardly through the aperture of each of the wafers 1 in the stack. The post may have a base extending radially outwardly at one end to facilitate removal of the stack of wafers 1 mounted thereon.

Optionally, the modular housing structure may be mounted on a post or have a plurality of legs extending downwardly to raise the housing 2 off the ground. As shown in FIGS. 9-15, the housing 2 may extend downwardly a desired distance to raise the opening 4 and core 5 off the ground to protect the developing bees in the recesses 3 from predators.

The wafers 1 are made of a porous material to permit drainage and breathability for the developing bees in the recesses 3. The porosity of the material used to form the wafers 1 is important for preventing the growth of mold that could harm the bees during their development. Preferably, the wafers 1 are made from a mixture of sand, Portland cement, and water. The preferred ratio of sand to Portland cement is 4:1 and the mixture has 20% water. Preferably, the wafers 1 are formed by a block press using a mould. The housing 2 may be made of any suitably durable material, but is preferably made of the same material as the wafers 1. Preferably, where a substantially solid core 5 is used, the core 5 and the housing 2 are integrally formed and made of the same mixture of sand, Portland cement, and water as described above for the wafers 1.

The present invention has been described and illustrated with reference to an exemplary embodiment, however, it will be understood by those skilled in the art that various changes may be made and equivalents may be substituted for elements thereof without departing from the scope of the invention as set out in the following claims. Therefore, it is intended that the invention not be limited to the particular embodiments disclosed herein.

What is claimed is:

1. A modular housing structure for solitary bees, comprising a core partially enclosed within a housing having an opening on one side, wherein the core has an exposed side facing the opening on the housing and one or more recesses formed on the exposed side of the core;
    wherein the core comprises a plurality of wafers stacked on top of one another and, wherein each wafer has a top, a bottom, and opposing sides;
    wherein the one or more recesses formed on the exposed side of the core comprises one or more recesses formed on one of the opposing sides of each wafer;
    wherein the plurality of wafers are arranged in the stack with the one or more recesses on each wafer on the exposed side of the core;
    wherein the core is formed from a porous material to facilitate drainage from the one or more recesses; and
    wherein the porous material is a mixture of sand, Portland cement, and water and, wherein the ratio of sand to Portland cement is 4:1.

2. The modular housing structure of claim 1, wherein the housing extends outwardly from the exposed side of the core to form a ridge about the perimeter of the exposed side of the core.

3. The modular housing structure of claim 1, wherein each wafer has a top section and a bottom section each having opposing top and bottom faces and, wherein the one or more recesses are formed by complementary grooves on the adjacent top and bottom faces of the bottom section and the top section of the wafer.

4. The modular housing structure of claim 1, wherein the one or more recesses are between 4 mm and 8 mm in diameter.

5. The modular housing structure of claim 1, wherein the housing extends downwardly to raise the opening and the exposed side of the core off the ground.

* * * * *